United States Patent Office 2,908,655
Patented Oct. 13, 1959

2,908,655
PROCESS FOR PREPARING A CATALYST

Carl D. Keith, Munster, Ind., assignor to Sinclair Refining Company, New York, N.Y., a corporation of Maine No Drawing. Application July 16, 1956
Serial No. 597,898

7 Claims. (Cl. 252—465)

This invention relates to a method for manufacturing catalysts which are useful in various reactions including hydrocarbon conversion reactions, particularly those conducted in the presence of free hydrogen such as hydrodesulfurization. More specifically, this invention is concerned with the manufacture of such catalysts which are comprised of defined catalytically active components supported on a solid base material.

A great many solid based catalysts have been employed in various chemical reactions. These catalysts have as the carrier or base material a solid such as alumina, silica, etc., and their activity and aging characteristics in a given reaction are usually due not only to the catalytically active component deposited on the base but also to the association of the catalytically active component with a given base material. These catalysts are particularly useful in hydrocarbon conversion reactions including those conducted in the presence of free hydrogen. Typical of operations conducted in the presence of free hydrogen are hydrogenation, dehydrogenation, hydrodesulfurization, hydrocracking, hydrorefining and reforming. Feeds charged to these systems are commonly petroleum-derived hydrocarbons.

There have been a number of methods described for preparing solid based catalysts. To prepare an alumina based catalyst, alumina particles in undried form or after partial or complete drying or even after calcination have been impregnated with aqueous salt solutions to add one or more components which will enhance catalytic activity. Frequently a dried or calcined alumina is impregnated with a solution of one component, re-dried, impregnated a second time to increase the percentage of the component or to introduce a second component, and again dried. Even more than two impregnations are sometimes used. These methods for preparing solid based catalysts have disadvantages. For instance, the water-soluble salts employed are frequently expensive as compared with the cost of salts of low water solubility which, due to their solubility characteristics, generally find less uses in the chemical industry. Frequently, the soluble salt is in the form of a nitrate and upon subsequent heating of the dried material noxious and corrosive nitrogen compounds are evolved which necessitate special equipment and represent a potential hazard to personnel.

Other anions introduced through use of the water-soluble catalytically active metal salts are equally disadvantageous. For example, chloride can be deleterious as it causes corrosion of processing equipment. To avoid these effects, operators have employed expensive and time-consuming washing operations to reduce the anion content. Also multiple impregnations, indicated above, require multiple dryings, thereby slowing production and increasing processing costs. Additions by impregnation may also result in higher percentage of components on some particles as compared to others.

When the catalytically active component is incorporated into the base structure by precipitation, various reagents have been employed as precipitants. Invariably these extraneous agents include undesirable catalyst constituents. For example, if a basic precipitant be employed, such as sodium hydroxide, sodium ions are introduced which may poison the catalyst, while if an acidic precipitant be employed the undesirable anions are present. Unless contaminating ions are subject to removal by heating during calcination, washing procedures are usually employed; however, it is sometimes difficult to wash without also partially removing a desired component.

In another method for preparing these catalysts precipitation of the base and of the catalytically active component is effected simultaneously. This method is equally disadvantageous as those employing a preformed base and water-soluble salts, since the undesirable and poisoning cations and anions are again introduced which necessitates considerable water washing. Thus, all of these methods for preparing solid based catalysts are disadvantageous in that they require relatively expensive reagents, extensive water washing, and complicated processing equipment which in many instances must be specifically designed for the particular catalyst manufactured.

In the present invention it has been found that valuable catalysts cotaining a solid base and certain mixed metals as active catalytic components can be prepared from substantially water-insoluble compounds of the metals by simple procedural operations. The mixed metal portion of the catalysts is comprised of mixtures of component (1) which is one or more metals of atomic number from 26 to 30 and component (2) which is one or more of the metals of group V A of atomic number not greater than 41 and of group VI A of atomic number not less than 42. The metals of atomic number from 26 to 30 are iron, cobalt, nickel, copper and zinc. Vanadium and niobium are the metals of group V A having atomic number of 41 or less while the metals of group VI A of atomic number not less than 42 are molybdenum and tungsten. The compounds of the component (2) metals which are useful are the substantially water-insoluble, relatively acidic oxides such as the acid or acid anhydride forms. The compounds of the component (1) metals employed are substantially water-insoluble and are usually offered as the carbonate, oxide and hydroxide which are basic with respect to the oxides of the component (2) metals. Other useful forms of these inorganic compounds include the bicarbonates, basic carbonates and hydrated oxides. I prefer to employ the metal carbonates. Due to the solubility characteristics of these various metal compounds they are normally less expensive by an appreciable factor than water-soluble compounds and the former may be commercially available as process by-products.

In the present invention divided or ground forms of the water-insoluble compounds of the metals desired in the catalyst are slurried in an essentially aqueous medium usually at a temperature of at least about 100° F. I prefer temperatures of about 140 to 205° F., but higher temperatures can be employed say, for instance, up to about 212° F. Temperatures greater than about 212° F. can be used but this is not ordinarily done since superatmospheric pressures would be required to maintain the water in the liquid phase. The resulting slurry is stirred, usually for at least about 10 minutes and preferably at least about 1 hour. There is no limit on the length of time the slurry can be mixed except as to economic considerations.

The slurry is then intimately mixed with particles of the solid catalyst base, e.g. by mulling as in a Simpson Intensive Mixer Serial 49426. Preferably, the slurry is added to the base at an elevated temperature of at least about 100° F., e.g. usually between about 140 to 212° F. The mulling is essentially a dry mixing operation, that is the amount of water present is restricted so that the mixture undergoing mulling has the properties of divided solids rather than those of a liquid or slurry even though the mixture can contain free water. The mulling is performed so that immediate and complete mixing of the solids is accomplished and there is solid-to-solid friction, for instance between the mixing apparatus and catalyst particles and between the solid catalyst particles themselves, although no actual grinding need be accomplished. Grinding is considered to connote a particle size reduction which may take place in my mulling operation; however, this is not a necessity. The mulled solids are then dried and calcined to prepare the catalyst. Generally, drying will remove a substantial amount and maybe all of the free water present. The catalyst is calcined according to procedures known in the art, generally at temperatures of about 800 to 1200° F.

The amount of mixed metal compounds employed in providing the aqueous slurry can vary considerably and the ratio of mixed metals desired in the final catalyst is usually the controlling factor. Generally, the slurry will contain about 1 to 20 parts by weight of metal component (1) compound and about 2 to 25 parts by weight of metal component (2) compound based on the finished catalyst. The amount of water present in the slurry can vary as desired. There must be enough present to give the mixture the characteristics of a solid-liquid slurry and there is no particular upper limit on the amount of water which can be employed. If the slurry contains too much water it may be necessary to evaporate a portion so that when it is added to the base before mulling, the mixtures are of the characteristics necessary in this operation. However, the addition of too great a quantity of water to the slurry necessitating its removal before mulling involves needless expense and tends to defeat the advantages of the present invention.

My present process is particularly advantageous since steps such as filtering and drying need not be effected. For instance, in a typical preparation the slurry is mulled with the particulate base and the water content of the slurry or of the muller mixture can be adjusted to provide an extrudable mass. The catalyst is then completed by extrustion and calcination. Thus when provided with a particulate base material, no filtering or distinct drying steps are necessary in my process. The drying and calcination can be conducted as a single operation but if desired, the catalyst particles can be dried before calcination. In my method it is advantageous to form macrosized catalyst particles which are generally at least about 1/16" and not greater than about 1/4" in diameter and have lengths from about 1/16" to 1" or more, preferably not greater than about 1/4". These macrosized particles can be provided as by tabletting; however, I prefer to extrude as in a Sprout-Waldron mill or a barrel-auger extruder. The amount of water present in the mixture used for extrustion is sufficient so that the mixture will pass through the extruder in a continuous manner; however, the amount of water should not be so great that the extruded streams or particles are so soft that they do not assume definite shapes. I can also directly calcine the particles issuing from the mulling operation to provide finely divided catalyst susceptible for use in fluid type operations.

The base utilized in the present method is particulate. The base can comprise any solid catalyst carrier material. Suitable bases include, for instance, alumina, silica, magnesia, titania, zirconia, thoria, etc., and their mixtures. Usually the base is comprised of one or more water-insoluble metal oxides and are preferably synthetically prepared, e.g. alumina. The base may be in the hydrogel or non-hydrogel form and can be previously dried or calcined. Particularly suitable bases are the alumina hydrates such as monohydrate and trihydrate.

Preferably, the alumina hydrate contains about 10 to 75 weight percent of trihydrate with substantially the remainder being amorphous or a form detected as monohydrate, e.g. boehmite, by X-ray diffraction techniques using samples dried at 120° C., or mixtures of these forms. Usually the trihydrate content of the alumina will be not greater than about 50 weight percent. Also the hydrate can be partially or completely dried or partially or completely calcined before mulling. The size of the particulate alumina or other base can vary; however, finely ground particles or spray dried microspheres are preferred as they present large external surface areas. The alumina base can contain minor amounts usually up to about 25% by weight of promoting or stabilizing constituents such as for instance silica, titania, zirconia, magnesia, thoria, boria, fluoride, etc. Either the slurry or the alumina base can contain additional catalytically active metal components. Also, the aqueous medium employed in preparing the slurry can contain when desired minor amounts of non-aqueous constituents, as for instance alcohols.

The amount of mixed metals employed in making the catalysts can be varied considerably. Selection of particular amounts will depend upon many factors such as feed stock composition, activity desired, processing conditions, etc. In general, the weight of metal component (1) calculated as the oxide comprises about 1 to 20 weight percent based on the finished catalyst, while the metal component (2) calculated as the oxide will comprise about 2 to 25 weight percent. The base material usually comprises a predominant part of the catalyst composition.

The following specific examples will serve to illustrate the present invention; however, they are not to be considered limiting.

Example I 57.5 grams of cobalt carbonate (28.43 grams of cobalt) are dry mixed with 102.5 grams of molybdenum trioxide (Mallinckrodt Analytical Reagent grade) in a two-liter beaker. One liter of deionized water is added and the mixture is stirred to form a slurry. The slurry is heated to boiling and held at the boiling point for ten minutes. At this point deionized water is added to bring the slurry to its original volume, and it is again heated to boiling. The hot slurry is added to a particular alumina hydrate containing 30% trihydrates with the remaining being boehmite and amorphous by X-ray diffraction analysis of a sample dried at 110° C. In this operation the hot slurry is added in small portions over a six minute period to a fine powder of 1800 grams of the alumina hydrate (oven dried at 120° C.) in a Simpson mixer with brief mixing after each addition. The resulting mix is powdery and dry and over a fifteen minute period 400 milliliters of deionized water are added in 50 millilter portions with mixing after each addition. Mixing is continued for fifteen minutes and the mixed particles are extruded through a 2½" barrel-auger extruder (Welding Engineers) having a 1/16" die plate. Before final extrusion the mixture was passed through the heated extruder three times to reduce the moisture content and obtain a firmer extrudate. The extrudate is dried at 120° C. in a forced air oven and broken by hand to less than ¼" lengths. The extrudate is calcined in flowing air at 900° F. for six hours in a muffle furnace brought from ambient temperature to 900° F. in about three hours.

Example II 12,300 grams of $SiO_2$—12% $Al_2O_3$ hydrogel, equivalent to 1350 grams of $SiO_2$—$Al_2O_3$ on a dry basis, are dried in a high humidity atmosphere at 110° C. to reduce the moisture content to about 65%. The partially dried hydrogel is ground with a hammer mill to reduce the particle size and break up hard particles formed during the drying step. 51.8 grams of nickel carbonate (Sinclair Chemical Co., contains 42.13% Ni) are dry mixed with 106.4 grams of vanadium pentoxide (Coleman and Bell, Tech. Grade) in a one-liter beaker. Approximately 600 ml. of deionized water are added and the mixture is stirred to form a slurry. The slurry is heated to about 210° F. and held at near boiling point for 30 minutes. The volume of the slurry is held relatively constant by adding deionized water to replace the water lost by evaporation. The partially dried, ground $SiO_2$—$Al_2O_3$ is placed in a Simpson mixer and the hot slurry is added in small portions over a 5 minute period with brief mixing after each addition. Mixing is continued and the moisture content is adjusted, by deionized water addition, to obtain a mix of thick plastic consistency. The mix is extruded with a 2½″ barrel-auger extruder (Welding Engineers) through a ⅛″ die plate. The extrudate is placed in a forced air oven maintained at 50° C. and dried to essentially constant weight. The extrudate is further dried at 110° C. and broken by hand to less than about ¼″ lengths. The extrudate is then calcined in flowing air at 900° F. for 6 hours in a muffle furnace brought to this temperature in three hours from ambient temperature.

*Example III*

55.8 grams of zinc carbonate basic (Mallinckrodt Analytical Reagent Grade, ca. 70% ZnO) are dry mixed with 119.8 grams of acid tungstic ($WO_3 \cdot H_2O$, Baker's Analyzed, C. P.) in a 2 liter beaker. About 1 liter of deionized water is added and the mixture is stirred to form a slurry. The slurry is heated to about 210° F. and held near the boiling point for 30 minutes. The volume of the slurry is held relatively constant by adding deionized water to replace water lost by evaporation. The hot slurry is added in small portions over a 5 minute period, to 1350 grams of Johns-Manville Celite No. 337, diatomaceous silica, in a Simpson mixer, with brief mixing after each addition. Mixing is continued and the moisture content is adjusted, by deionized water addition, to the proper consistency for extrusion. The mix is extruded with a 2½″ barrel-auger extruder (Welding Engineers) through a ⅛″ die plate. The extrudate is dried at 110° C. and broken by hand to less than about ¼″ lengths. The extrudate is then calcined in flowing air at 900° F. for 6 hours in a muffle furnace brought to this temperature in three hours from ambient temperature.

It is claimed:
1. In the manufacture of a catalyst, the steps comprising slurrying in an essentially aqueous medium at a temperature of at least about 100° F., a water-insoluble inorganic compound of a metal of atomic number from 26 to 30 with a water-insoluble acidic oxide of a metal selected from the group consisting of metals of group V A having an atomic number not greater than 41 and metals of group VI A having an atomic number not less than 42, mulling the slurry with particulate catalyst base material and calcining the mulled solids.

2. The method of claim 1 in which the base material is alumina.

3. In the manufacture of a catalyst, the steps comprising slurrying in an essentially aqueous medium cobalt carbonate and molybdenum trioxide at a temperature of about 140 to 212° F., mulling the slurry with particulate alumina, and calcining the mulled solids.

4. The method of claim 3 in which the alumina is a hydrate containing about 10 to 50 weight percent of trihydrate.

5. The method of claim 4 in which the mulled solids are extruded to form macrosize particles before calcination.

6. The method of claim 1 wherein the slurry contains about 1 to 20 parts by weight, based on the finished catalyst, of the inorganic compound and about 2 to 25 parts by weight, based on the finished catalyst, of the acidic oxide.

7. The method of claim 6 wherein the inorganic compound is a metal carbonate.

References Cited in the file of this patent

UNITED STATES PATENTS

| | | |
|---|---|---|
| 1,943,821 | Hanks et al. | Jan. 16, 1934 |
| 2,101,104 | Smith et al. | Dec. 7, 1937 |
| 2,118,829 | Storch | May 31, 1938 |
| 2,696,475 | Farrow | Dec. 7, 1954 |
| 2,755,257 | Donovan et al. | July 17, 1956 |
| 2,764,526 | Johnson et al. | Sept. 25, 1956 |